Feb. 23, 1943.    E. F. W. ALEXANDERSON    2,312,061
ELECTRIC DRIVE
Filed Nov. 20, 1940    5 Sheets-Sheet 1

Inventor:
Ernst F. W. Alexanderson,
by Harry E. Dunham
His Attorney.

Fig. 5.

Patented Feb. 23, 1943

2,312,061

UNITED STATES PATENT OFFICE 2,312,061

ELECTRIC DRIVE

Ernst F. W. Alexanderson, Schenectady, N. Y., assignor to General Electric Company, a corporation of New York Application November 20, 1940, Serial No. 366,322

11 Claims. (Cl. 290—4)

This invention relates to electric drives and more particularly to improvements in the control of multiple-unit power-plant synchronous-to-synchronous type reversible electric drives.

By "multiple-unit power-plant" is meant that the electric generating portion of the drive consists of a plurality of parallel-connected generators, each of which is driven by its own individual prime mover such, for example, as a Diesel engine. These generators supply current to a single motor and by "synchronous-to-synchronous" it is meant, that the motor and the generators are synchronous machines. That is to say, they have alternating current carrying armature windings, which are usually the stator windings, and have direct current carrying field or exciting windings, which are usually mounted on the rotor. Although the motor normally operates as a synchronous motor it may also be operated for short periods as an induction motor in which case the ordinary amortisseur winding may be used as a squirrel cage winding.

The multiple unit idea is conducive to reliability so that such an electric drive is well adapted for naval vessels. Furthermore, the use of synchronous machines gives very desirable lightness as modern machines of this type have been made which weigh no more than four pounds per horse-power. In addition, the efficiency of these machines is high because their excitation is derived from direct current which is supplied at unity power factor, whereas in induction motors, for example, the alternating exciting or magnetizing current is supplied at very low power factor.

It is usually desirable that electric drives should be reversible and in the case of naval vessels it is highly desirable that the reversal will take place as rapidly as possible and at full power output. However, a ship propulsion system differs from ordinary drives in that after the driving motor has been stopped it tends to be rotated by the propeller so long as the ship is in motion because of the reaction of the water on the propeller blades. Therefore, if, for example, the ship has been operating in a forward direction and the motor is brought to standstill by suitable braking means, the inertia of the ship still keeps it in motion so that a powerful torque is exerted by the propeller on the motor tending to rotate it in the forward direction and this torque must be overcome before the motor can be accelerated in the reverse direction.

In the prior art this problem has been solved in two ways. One method which has been used on turbo-electric ships is to increase the field excitation of the generators and use the propeller motor as an induction motor for both braking and reversal. Induction motor braking is sometimes referred to as "plugging" and consists of reversing the phase connections of the motor so as to produce a decelerating torque. This method is applicable to multiple generators driven by Diesel engines as well as to single generators driven by turbines, but it has the limitation that braking by induction motor action is rather inefficient and it is found that when the weight of the motors and generators are reduced to meet modern requirements the induction motor braking torque is not sufficient to bring the motor to standstill against the torque of the water acting on the propeller.

Another method which has been used on Diesel electric ships with multiple generators is to disconnect the motor from the generators and bring the motor to standstill by applying field to the motor while resistance is introduced in the armature. The multiple generators are in the meantime maintained in synchronism by uninterrupted application of generator field. A change in connection is then made whereby the motor is brought up to speed in the reversed direction as an induction motor with reversed phase rotation fed from the generator bus bar. This method, however has the limitation that the switching must be done with the generator bus bars alive. In modern high power vessels this is a serious objection.

The solution which I propose combines the advantages of the first and second methods. It retains the advantage of the system used in many turbo-electric ships that have been built, that switching is done on dead circuits, but at the same time it makes it possible to use multiple generator units. It is characterized by removing the generator excitation while connections are being changed and I have found by test that the desired results may be obtained by the following sequence of control. First, field is removed on both the generators and the motor. Second, the phase rotation of the connections between the motor and the generators is reversed. Third, field is applied to the motor which thereby develops a powerful dynamic braking torque due to the currents flowing in the closed circuit between the motor and the generators and in this way the propeller is brought to standstill. Fourth, field excitation is applied to the generators substantially simultaneously with the removal of field excitation from the motor. As a result of this the generators synchronize with each other and cause the propeller motor to act as an induction motor with the required reversing torque.

I have found that if the generators are driven by prime movers with reasonably equal torque characteristics the synchronization takes place so fast that the induction motor torque appears for all practical purposes immediately. I realize, however, that over a wide range of speed settings, such, for example, as a range of 4 to 1 centrifugal governors and their controlled engines will not always have sufficiently similar speed torque characteristics to enable rapid self-synchronization or even self-synchronization at all. A 4 to 1 range of speed adjustment is, however, almost necessary because the speed setting of the governors should be adjusted to about one-quarter speed in order to obtain the maximum motor starting torque, it being remembered that the slip torque characteristic of an induction motor is such that maximum torque occurs at a point between zero and 100% slip and generally in the neighborhood of about 75% slip.

In order to compensate for inequalities in governor and engine characteristics over a wide range of speed settings I therefore provide an automatic device for readjusting the governors so as to synchronize the generators. During the period when the automatic synchronizer is acting there will thus be an interval when full induction torque is not being developed. I have found, however, that during this interval before the generators have synchronized the propeller motor develops a pulsating torque which is sufficient to hold the motor at standstill until synchronization is completed and full reversing torque is applied.

Sometimes the governor characteristics or settings may be so dissimilar that the weaker machine will stall before the automatic synchronizing means can correct the situation. An additional explanation for this is that the power factor of the inductive load increases with decreasing frequency, thus giving an unstable speed torque characteristic. As stalling of the prime mover, particularly if it is a Diesel engine, is highly undesirable and as the automatic resynchronizing means may not operate fast enough to prevent stalling, my invention also includes automatic means for quickly removing the load on a machine whose speed drops seriously below the average speed of all of the machines.

An object of my invention is to provide a new and improved electric drive.

Another object of my invention is to provide a new and improved reversible electric drive control system.

A further object of my invention is to provide an improved control system for a reversible synchronous-to-synchronous electric drive having a plurality of parallel-connected separately-driven generators.

A still further object of my invention is to provide a new and improved ship propulsion system.

Still another object of my invention is to provide a new and improved ship propulsion control system having a reversible synchronous propeller motor which is energized from a plurality of separately-driven parallel-connected synchronous generators.

Yet another object of the invention is to provide a new and improved automatic synchronizing and protective system for a plurality of parallel-connected separately-driven synchronous generators.

An additional object of the invention is to provide a ship propulsion system which combines the advantages of minimum weight of motors and generators, multiple generators driven by separate prime movers, switching only on a dead circuit, high dynamic braking torque combined with high induction motor reversing torque, a smooth transition from braking to reversing, no necessity for using external resistance during dynamic braking and no necessity for using higher than normal generator excitation during induction motor reversing.

The invention will be better understood from the following description taken in connection with the accompanying drawings and its scope will be pointed out in the appended claims.

Figure 1:
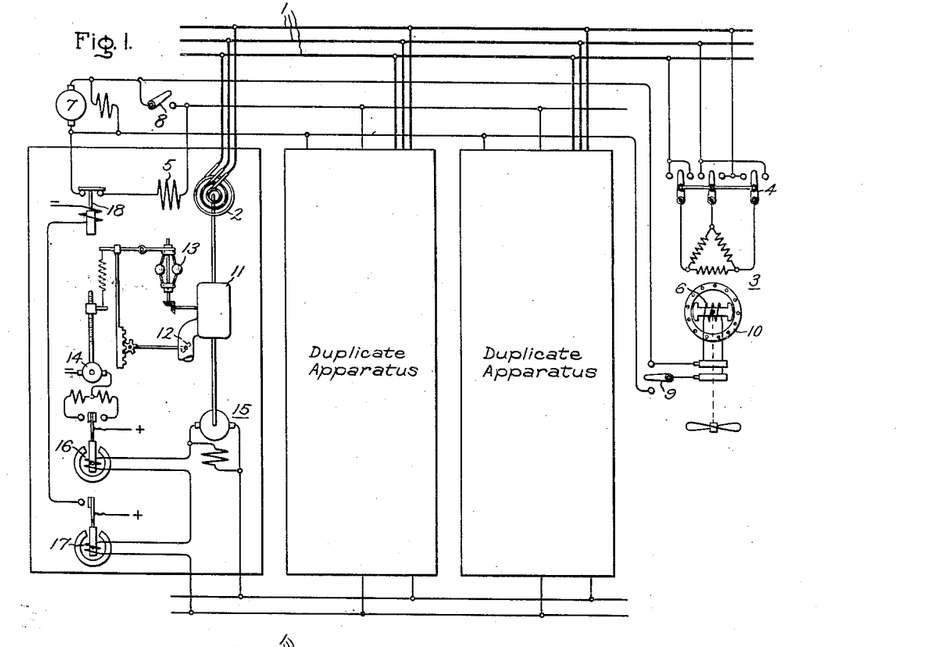
Fig. 1 is a diagrammatic illustration of an embodiment of the invention.

Referring now to the drawings and more particularly to Fig. 1, I show therein by way of example a three-phase system embodying certain features of my invention. This system comprises a main three-phase power circuit 1 across which are connected a plurality of synchronous generators 2 and a synchronous motor 3.

In order to simplify the drawings mere duplication has been avoided by showing one generator 2 and its driving and individual control equipment in a box and it is to be understood that the other appropriately labeled boxes contain duplicate equipment. The phase rotation of the motor connections is made selectively reversible by means of a reversing switch 4. The generators are each provided with a direct-current field winding 5 and the motor is provided with a similar winding 6. These windings may be energized from any suitable source of direct current, such, for example, as a common shunt-connected exciter 7. A switch 8 is provided for selectively controlling the energization of all of the generator field windings 5 and a similar switch 9 is the corresponding controlling means for the motor field winding 6. The motor is also provided with an amortisseur or squirrel cage winding 10.

The generators are separately driven by suitable prime movers 11, such for example, as Diesel engines. These engines have throttles 12 controlled by speed governors 13 and the setting or spring tension of each governor is adjusted by a separate reversible synchronizing motor 14.

The automatic means for synchronizing the generators consists of individual devices driven by each engine for giving an indication of its speed. As shown by way of example, these devices are pilot or tachometer generators 15, all of which are electrically connected in parallel. The voltages of these generators are such that they are all equal when the speeds of their respective engines are equal under which conditions no current will flow in them. If, however, the speeds are different the voltages of the pilot generators will be unequal and the currents which flow in them will be proportional in magnitude to the difference between the speeds of their driving engines and the average speed of all of the driving engines and the polarity of these currents will be an indication of the direction of the departure of the individual engine speed from the average engine speed. Selective response to the polarity of such current is secured by separate contact-making polarized relays 16 connected in circuit with each of the pilot generators 15. Each relay is connected to control the operation of the reversible synchronizing motors 14 for the governor of its associated engine and the connections are such that when the engine speed departs from the average speed the response of the relay 16 is such as to cause the synchronizing motor 14 to adjust the governor setting in the proper direction to change the engine speed in the direction toward the average speed.

In order to prevent stalling of the engines 11 in case their speed should drop too rapidly for the automatic synchronizing means to restore synchronism, protective means is provided. This means is shown by way of example as another polarized relay 17 connected in series with the relay 16 and having a single set of contacts which are normally open but which close when the polarity of the pilot generator current is such as to indicate that its associated engine speed is below the average engine speed and when the magnitude of this current is higher than the magnitude of the current which causes operation of the relay 16. The contacts of the relay 17 control an auxiliary relay 18 for opening the generator field circuit so that whenever the engine speed falls seriously below the average speed its field energization is removed thereby substantially instantaneously removing the engine load and preventing the engine from stalling.

The operation of the automatic synchronizing means and the means for preventing stalling should be clear from the above description and as already pointed out these means are always ready to respond to a loss of synchronism or to an initial asynchronous condition of operation and their effect is always to produce synchronous operation. In addition, it is pointed out that the relays 16 and 17 work together in the sense that relay 16 is already acting to increase the speed of its associated engine at a time when relay 17 operates and the effect of the operation of relay 17 is also to increase the speed of the engine by removing its load although of course not by increasing the speed setting of the governor as is the case with the relay 16. Furthermore, when the relay 17 reopens in response to the increase in speed the relay 16 will still be increasing the speed setting of the governor so that usually only one operation of the relay 17 will suffice before the automatic synchronizing means will restore synchronous operation of the associated power plant.

The method of reversing the motor 10 which in a ship propulsion system will be directly connected to a propeller is as follows. Assume first that all of the synchronous machines are synchronized and that the generators are all supplying power to the motor 10 which is turning the propeller so as to drive the ship ahead. Under these conditions switches 4, 8 and 9 will be closed, relays 16 and 17 will be open and relays 18 will be closed. If now it is desired to reverse the motor 10, switches 8 and 9 are opened, either in the order mentioned or in the opposite order or simultaneously, this removes the excitation from all of the machines and reduces the current in the main circuit 1 substantially to zero.

The reversing switch 4 is then thrown to its other closed position, say, for example, from left to right. The switch 9 is then reclosed. The reaction of the water on the propeller due to the continued forward motion of the ship provides a powerful torque for continuing the rotation of the motor in the forward direction so that when field excitation is reapplied by the closing of the switch 9 the motor acts as a generator and supplies current to the relatively low resistance armatures of the parallel-connected generators 2. This constitutes a powerful dynamic braking circuit which very rapidly brings the motor 10 to standstill. I have found that this method of braking is the least expensive and most effective. Of course, the motor could be made to regenerate into separate resistances but this is expensive and requires additional switching means for the main power circuit. In theory it would also be possible to brake the motor 10 by plugging, that is, by energizing it as an induction motor with reversed phase rotation connections from the generators in which case the switch 8 would be closed instead of the switch 9. In that case the revolving amortisseur winding 10 cooperating with the stator winding would produce a reversed induction motor torque and this may also be strengthened by short circuiting of the winding 6, if desired. However, with low weight synchronous motors I have found that the braking torque obtained by this method is not sufficient to gain possession of the propeller and break it away from the water.

After the machine 10 has been braked to standstill the field switch 9 is again opened and the field switch 8 is closed. At this point it may be noted that so far as dynamic braking is concerned it is immaterial whether the phase rotation of the motor connections is reversed before the braking operation or after the braking operation as the braking torque will be the same in either case. However, it is preferable to remove the field excitation of all of the machines by opening both switches 8 and 9 and then reversing the connections by switch 4 instead of first dynamically braking the motor by merely opening switch 8 and then after it has been braked to standstill opening switch 9 and operating the reversing switch 4 because the water torque on the propeller continues after the motor has been brought to standstill so that the longer the interval of time during which there is no field on either the generators or the motor the better the opportunity the water has for regaining possession of the propeller and restarting the motor in the forward direction. Therefore, after the motor has been dynamically braked to standstill with the phase rotation of its armature winding reversed the field switch 9 is again opened and the field switch 8 is closed immediately thereafter. During the dynamic braking operation the generators 2 have, of course, been without field excitation so that there has been no synchronizing torque to hold them in synchronism. Ordinarily, however, they will have substantially the same no-load speed by reason of the previous adjustment of their governors but in all events the automatic synchronizing means will insure that their no-load speeds are substantially the same. However, synchronism of such machines depends not only upon their having the same speed but also their having the proper angular relationship between their rotors and in the absence of positive synchronizing torque it is impossible as a practical matter to maintain the speeds so uniform that loss of synchronism by relative phase displacement will not have taken place. Consequently, the generators will be out of synchronism when the switch 8 is reclosed. However, I have made the unexpected discovery that a strong holding torque is developed in the motor 3 as soon as the field excitation of the generators is restored and while they are out of synchronism. It is a pulsating torque and probably its frequency corresponds to a beat frequency produced by the combination of all of the individual generator frequencies. I have also found that a holding torque can be developed by not entirely removing the field excitation of the motor when the field is applied to the generators. It is undesirable to apply full field to motor and generators simultaneously because of mechanical vibration but a small additional holding torque of this type is permissible if the holding torque of the first type is insufficient.

The restoration of field excitation on the generators causes a synchronizing torque to be produced between any two machines whose rotor positions drift into the proper angular relationship for synchronous operation and as has already been explained the slight differences in speed which are bound to exist will cause these relationships to occur so that the generators inherently tend to resynchronize themselves and when this occurs the voltage builds up and the motor starts turning in the reverse direction as an induction motor by reason of the squirrel cage secondary effect of its amortisseur winding 10.

As soon as the motor has attained full speed as an induction motor the switch 9 may be closed to restore current to the field winding 6 and the motor 3 will then pull into step with the generators by means of the above-described effect of the synchronizing torque and will operate thereafter as a synchronous motor.

If the individual engine or governor characteristics are so different that the difference between the engine torques under load is greater than the synchronizing torque, the generators will of course not stay in synchronism but by reason of the unstable characteristic which tends to produce stalling, which has been described above, the change in speed resulting from such loss of synchronism while the generators are under load will be sufficient to cause operation of the synchronizing means which will act on all of the engines in such a manner as to reduce the speed of the fast engines and raise the speed of the slow engines and in cases of an aggravated loss of speed the action of the synchronizing means is aided by the action of the relay 17 for preventing stalling.

Another reason why it is desirable to have automatic synchronizing means, with or without the addition of auxiliary automatic stall control means, is that when the propeller motor is accelerated from rest as an induction motor, the generator speed should be reduced considerably below full speed in order to obtain maximum torque by reducing the slip. Best results are obtained at about one-quarter speed but this means a reduction of 16 to 1 in the centrifugal governor actuating force which varies as the square of the speed. As it is very difficult, if not impossible, to build governors with duplicate characteristics over a 16 to 1 range of operating force, the reduction of their settings from full speed to quarter speed will almost invariably result in substantial speed and speed-torque differences between the prime movers.

Figure 2A:
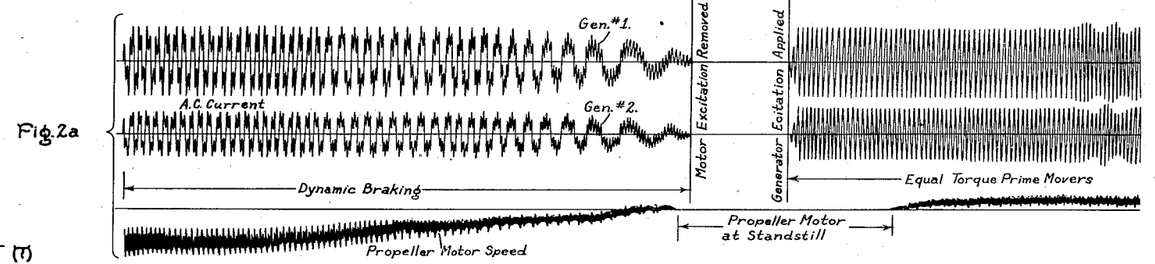
Figs. 2, 3 and 4 are oscillograms for explaining the operation of Fig. 1.
Figure 2B:
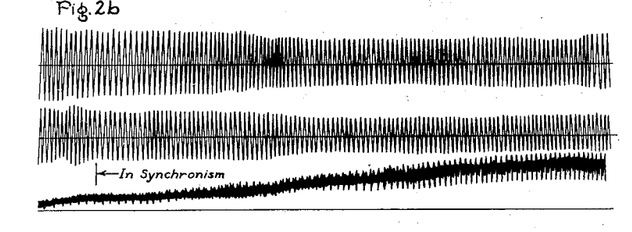
Figure 3A:
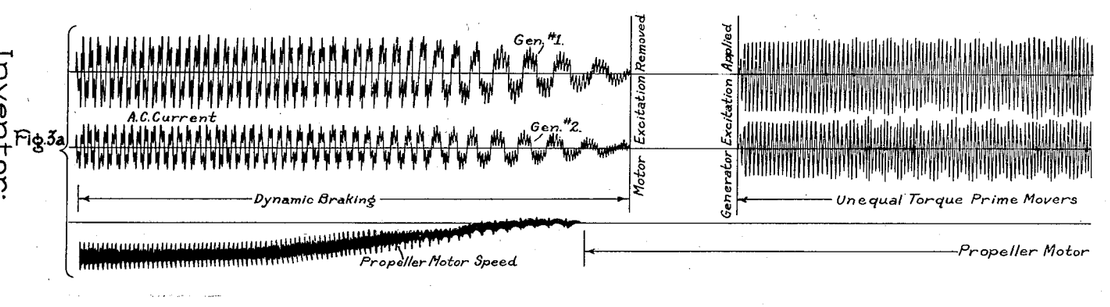
Figure 3B:
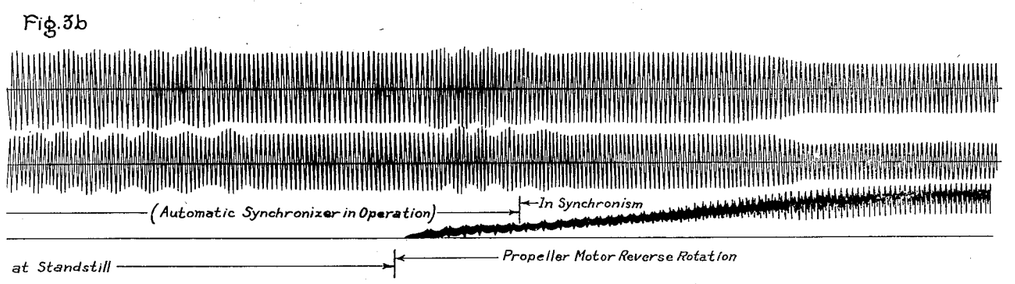
Figure 4A:
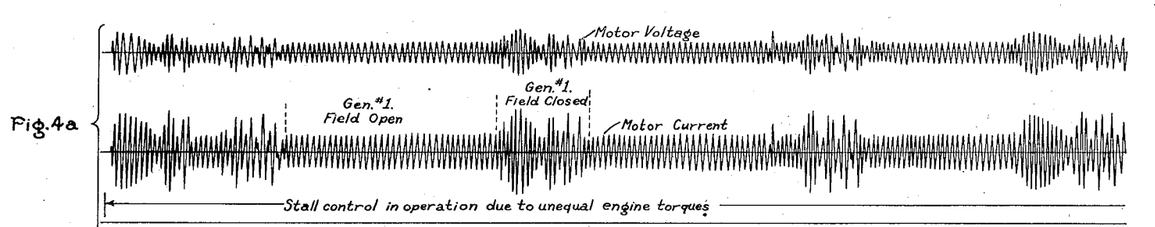
Figure 4B:
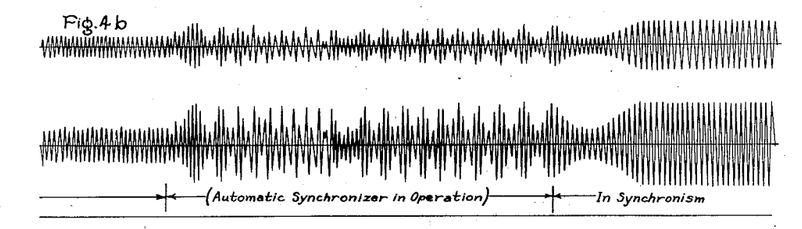

The operation of my invention under various different conditions of adjustment of the apparatus is shown in Figs. 2, 3 and 4. These figures cover sheets 2 and 3 of the drawings, Figs. 2A, 3A and 4A being on sheet 2 and Figs. 2B, 3B and 4B being on sheet 3 and they are so arranged that when the sheets are laid end to end in the direction of their longer dimension with sheet 3 on the right of sheet 2 the "B" portions of the figures register with the "A" portions, thus completing the figures. Fig. 2 shows the relation between the armature currents of two parallel-connected synchronous generators and the speed of the propeller motor during a braking and reversing operation when the generator prime movers have substantially equal speed torque characteristics. Fig. 3 differs from Fig. 2 in that the prime movers have such unequal torques that the automatic synchronizer operates for a definite length of time before synchronism is established. In Fig. 4 the motor voltage and current are shown beginning from the time that motor excitation is removed and the generator excitation is applied, that is to say, beginning with the starting of the motor when the generator prime movers have very dissimilar torques and ending with the establishment of generator synchronism after a period of operation of both the automatic stall control and the automatic synchronizer.

These figures read from left to right and beginning with a detailed consideration of Fig. 2 the lowermost wave is the voltage of a tachometer generator which is driven by the propeller motor and whose magnitude is proportional to the propeller motor speed. Its polarity is indicated by its direction with respect to the zero axis, the voltage below the zero axis representing speed in the forward direction and voltage above the zero axis representing speed in the reverse direction. The currents in the two generators are initially the dynamic braking currents which are generated in the motor and which circulate in the generator armatures. As will be seen, the frequency of these currents progressively decrease as the speed of the motor falls until the braking currents become zero when the motor speed becomes zero. At this point the motor excitation is removed and immediately thereafter the generator excitation is applied. The generator currents shown after the generator excitation is applied are generated currents and as shown by the similarity in the frequency of these currents the generators synchronize very quickly. It will be noted that there is a short interval after the generator excitation is applied before the motor starts turning in a reverse direction and that during this interval the motor has not had time to start turning again in the forward direction by reason of the water reaction on the propeller.

In Fig. 3 the left-hand portion up to the point where the generator excitation is applied is similar to Fig. 2. However, in this figure the prime mover torques are unequal so that synchronism is delayed for a substantial interval of time during which the automatic synchronizer is adjusting the governor settings so as to permit the generators to synchronize with each other.

During the entire interval during which the automatic synchronizer is in operation the propeller motor is held at standstill, as shown by the curve representing the propeller motor speed which coincides with the zero axis throughout this interval of time.

In Fig. 4 the torques of the prime movers are so different that the prime mover for generator 1 tends to stall. During the initial portion of the figure the stall control is in operation the field circuit of generator 1 first being open by the stall control for a sufficient length of time to permit the speed to rise above the setting of the stall control relay for this machine. The stall control relay then closes the field circuit and the prime mover speed again falls. This stall control cycle is repeated a few more times until the torques have been equalized sufficiently to prevent any tendency toward stalling. During all this time the automatic synchronizer is, of course, operating in the direction to increase the speed of generator 1 and reduce the speed of generator 2. After the stall control ceases operation the automatic synchronizer continues to operate until finally near the right-hand end of Fig. 4 the generators synchronize and the motor current and voltage become sinusoidal.

Figure 5:
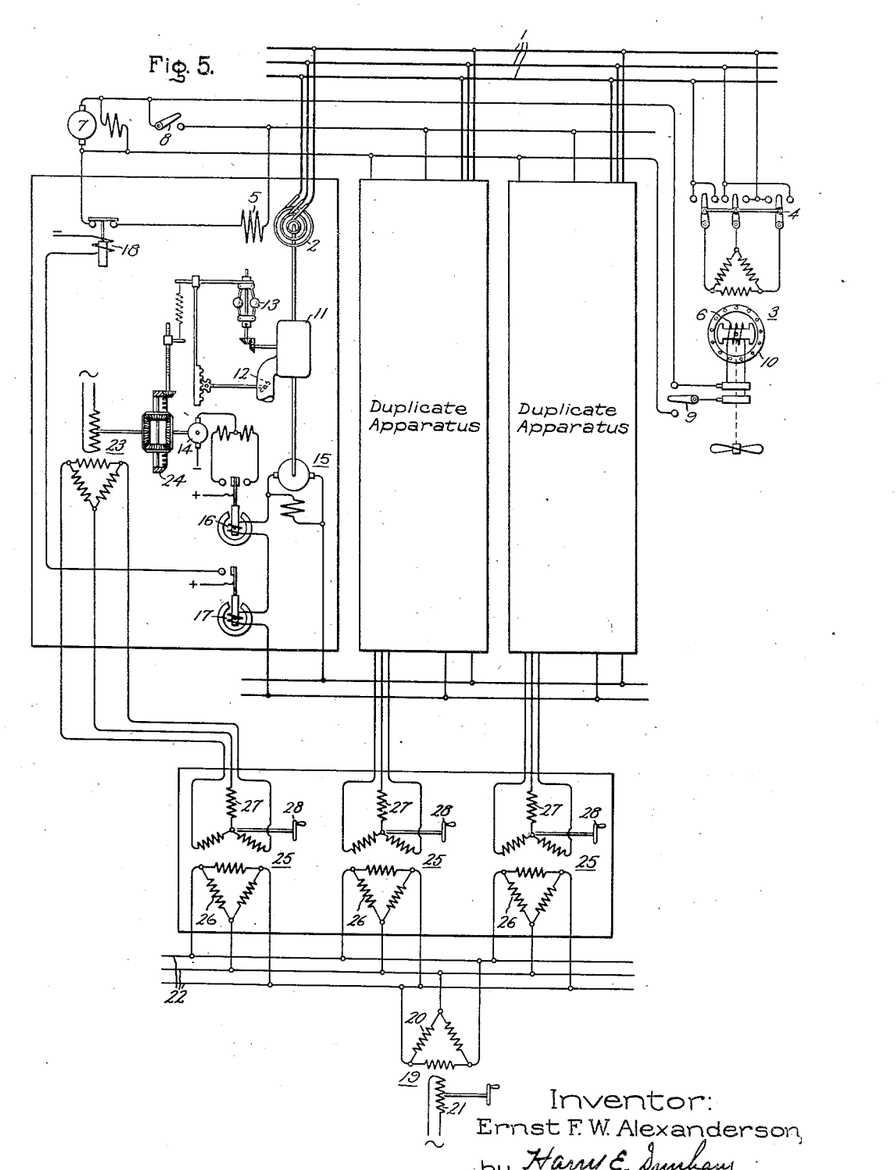
Fig. 5 shows the addition to Fig. 1 of manual speed and load division adjusting means.

In Fig. 5 manually operated means is shown for permitting simultaneous raising and lowering of the speed of the drive, together with individual manually operable means for adjusting the load distribution between various units. An electrical system for this purpose consists of a master transmitter 19 in the form of a three-phase synchronous motor in that it has a three-phase stator winding 20 and a single rotor winding 21. However, the rotor winding 21 is energized from a suitable single-phase source of alternating current. With such a device there is a different vector relationship of the voltages of the phase windings of the stator for every angular position of the rotor, it being understood of course that the stator voltages referred to are induced therein by the alternating field of the rotor 21. The stator winding 20 is connected by means of a three-phase circuit 22 to the stator of a receiver 23 which is similar in construction to the transmitter 19 and whose rotor is electrically connected to the same single-phase source of alternating current which supplies the rotor 21 of the transmitter. There is a separate receiver 23 for each engine governor and their stator windings are connected in parallel to the common circuit 22. Each of the rotors of the receivers 23 is mechanically connected to control the setting of the speed governor and as the synchronizing motor 14 must also control the governor setting these two devices are connected to the governor adjusting means through a suitable differential mechanism such as, for example, a conventional mechanical differential 24. In this manner the rotation of either the rotor of the receiver 23 or the synchronizing motor 4 will adjust the governor setting so that the governor may be adjusted independently by both of these means, its adjustment depending only upon the relative angular position of these two means. The angular position of the rotor winding of the receiver 23 is determined by the angular position of the rotor 21 on the transmitter because at any but the proper angular relationship the stator voltages of the transmitter and receiver will not balance each other so that synchronizing currents will flow and these will react magnetically upon the receiver rotor in such a manner as to turn it into the proper position as determined by the transmitter rotor.

Inserted between the common circuit 22 and each of the receivers is an electrical differential 25 comprising relatively rotatable three-phase windings 26, 27. Winding 26 is connected to the circuit 22 and winding 27 is connected to the stator of the receiver and as shown by way of example winding 26 is stationary and winding 27 is rotated by means of a handle 28. The device 25 is essentially a phase shifter as the phase relationship between the stator and rotor voltages is determined by the angular relationship between these windings. Consequently, rotation of the handle 28 will disturb the balance between the transmitter and the receiver and will cause the receiver rotor to rotate through an angle corresponding to that through which the rotor 27 is turned by the handle 28.

The operation is such that when the rotor of the master transmitter 19 is turned all of the governor settings are adjusted simultaneously by equal amounts in the same direction so that the speed of the engines is simultaneously raised or lowered thereby to control the speed of the ship or the other device operated by the motor 3. Ordinarily, such speed adjustment will not cause loss of synchronism but if the engine characteristics should be sufficiently different so as to cause loss of synchronism the automatic synchronizing means will operate to restore synchronism without changing the speed setting of the master transmitter.

The devices 25 are preferably all grouped together and located near the master speed adjusting transmitter 19. Operation of any one of the devices 25 by the rotation of their handles 28 will change the governor setting of their associated engines thereby to adjust at will the load distribution between the engines which adjustment may be desirable in case the engines are cold or in case one or more of them lose power, such as by failure of some of their cylinders to operate properly.

Figure 6:
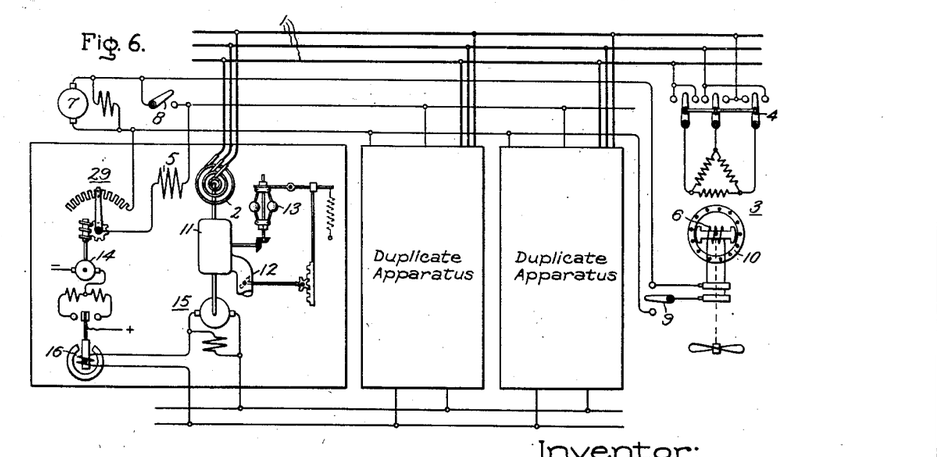
Fig. 6 is a modification of Fig. 1 showing a different form of automatic synchronizing system.

In Fig. 6 the motors 14 instead of being synchronizing motors for controlling the governor settings operate associated rheostats 29 which are serially connected in the respective field winding circuits of the generators. The relay 17 for preventing stalling which is shown in Fig. 1 and the manual control system as shown in Fig. 5 have been omitted so as to avoid duplication, although it will be understood that these means may be included if desired.

The operation of Fig. 6 is based upon the fact that the synchronizing torque of the synchronous machines is a function of their field excitation so that by raising the excitation of these machines the torque tending to hold them in synchronism increases and vice versa. Consequently, should the generators fall out of synchronism, the weak machines will have their field excitations increased so that the next time they drift into synchronous relationship the flow of synchronizing power which results will be sufficient to hold them in synchronism when they again tend to drift out of synchronism.

Figure 7:
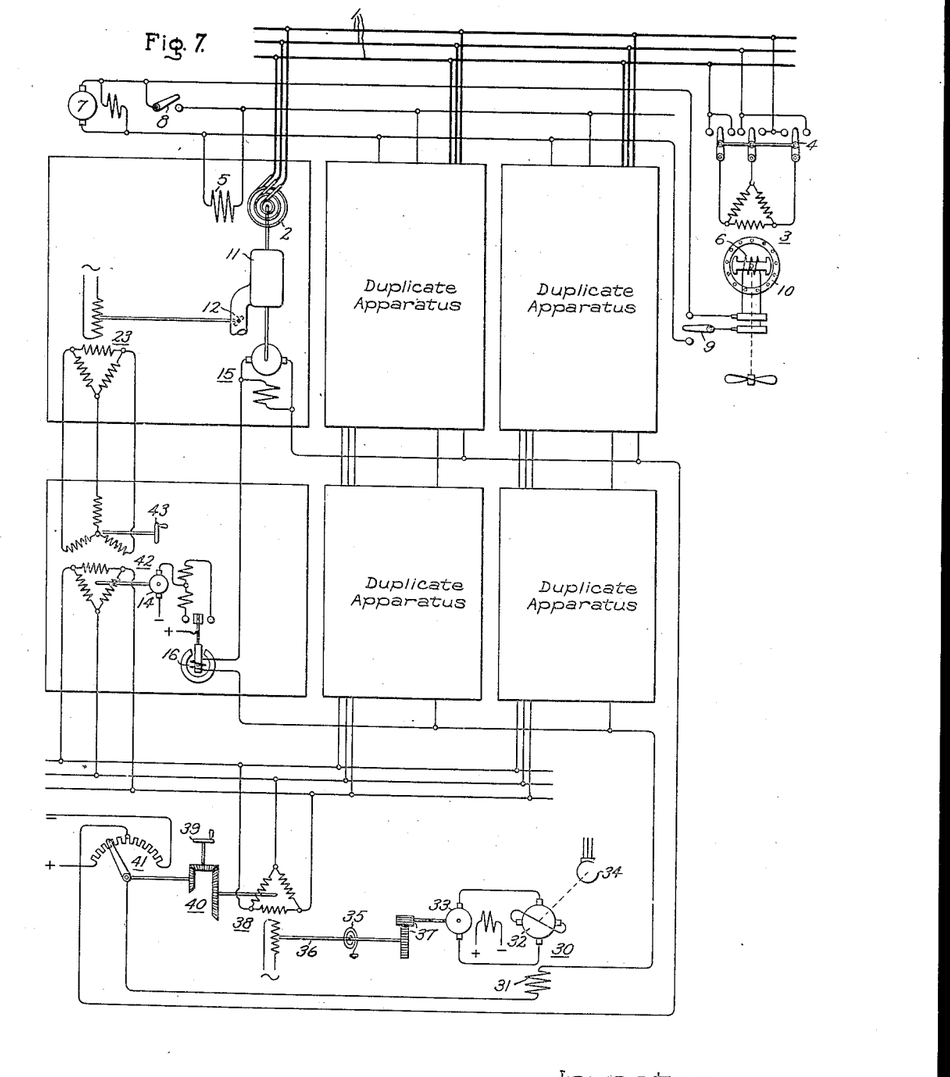
Fig. 7 is a further modification showing the addition of automatic speed regulating means to the system.

In Fig. 7 the system has been combined with the automatic speed regulator which has been described and claimed in my copending application Serial No. 346,583, filed July 20, 1940, and assigned to the assignee of the present application. The essential elements of the automatic speed regulator are an amplifying generator 30 having a field winding 31 serially connected in the direct current circuit across which all of the pilot generators 15 are connected in parallel. This machine has an armature 32 provided with a pair of load brushes connected to a direct current torque motor 33 and a pair of short circuited brushes whose axis is in quadrature with the axis of the load brushes. The axis of the field winding 31 coincides with the axis of the load brushes so that the voltage induced in the armature 32 by the field winding 31 is along the axis of the short circuited brushes thereby producing a heavy circulating current through the armature along the axis of the short circuited brushes and this heavy current produces what may be called a large cross armature reaction flux which provides the main excitation with respect to the load brushes. The armature 32 is driven by any suitable operating means such as a motor 34. The torque of the motor 33 is balanced by a spring 35 acting on a shaft 36 connected to the armature shaft of the motor by reduction gearing 37. The shaft 36 is connected to one of the windings of a master transmitter 38 which is similar to the master transmitter 19 except that both of its windings are rotatable. In this case the shaft 36 may, of example, operate a winding corresponding to the rotor winding 21 of the transmitter 19. However, the winding of the transmitter 38 corresponding to the stator winding 20 is made rotatable by suitable mounting and its angular position is adjusted by a hand wheel 39 through any suitable means such as beveled gearing 40 which also operates a potentiometer 41. The input circuit of the potentiometer is supplied with uni-directional potential from any suitable source and its output circuit is connected in series with the winding 31 in such a manner that its voltage is equal and opposite to the voltage of the common circuit energized by the pilot generators.

Another difference between Fig. 7 and the previous figures is that the receivers 23 are arranged to adjust their respective governor settings directly and differential transmitters or phase shifters 42 are connected in series with each of the receivers 23. These phase shifters are similar in construction to devices 25 in Fig. 2 except that both windings are made adjustable. As shown in the drawings, the angular position of one winding is adjusted by the motor 14 and the angular position of the other winding is adjusted by a handle or hand wheel 43 corresponding to handle 26 in Fig. 2. In this manner device 42 is part of the means for securing automatic synchronization and is also part of the means for securing manual adjustment of load division between the units.

In Fig. 7 the relays 17 for preventing stalling have been omitted for the reasons given above in connection with Fig. 6 although it will be understood that in the complete system they will be present.

The operation of Fig. 7 is the same as the operation of Fig. 5 except for the automatic regulation of the speed of the units. The automatic speed regulator operates as follows. The speed setting of the regulator is controlled by the hand wheel 39. For any position of 39 the corresponding position of the potentiometer 41 is such that its output voltage substantially exactly counterbalances the combined voltage of the pilot generators 18 when the engines are operating at the proper speed. If the engines should be operating too fast, the resultant voltage of the pilot generators would exceed the output voltage of the potentiometer 41, thus causing current to flow in a given direction on the control field winding 31 on the amplifying generator 32. A very small flow of current in this winding will cause a relatively large output voltage to be produced by the generator 32 thereby causing the torque motor 33 to rotate the shaft 36 which in turn will cause simultaneous adjustment of all of the governor settings in the proper direction to reduce speed. Similarly, if the speed is too low, current will flow in the opposite direction through the control field winding 31, thus causing the pilot motor 33 to turn in the opposite direction whereby all of the governor settings are adjusted so as to raise the speed.

While there have been shown and described particular embodiments of this invention, it will be obvious to those skilled in the art that various changes and modifications can be made therein without departing from the invention and, therefore, it is aimed in the appended claims to cover all such changes and modifications as fall within the true spirit and scope of the invention.

What I claim as new and desire to secure by Letters Patent of the United States is:

1. A multiple unit electric ship propulsion system comprising, in combination, a polyphase main power circuit, a synchronous propeller driving motor, switching means for selectively connecting said motor to said circuit for forward operation and with reversed phase rotation for reverse operation, a plurality of engines having substantially the same no-load speed but having appreciably different speed-torque characteristics, a plurality of synchronous generators connected in parallel to said main circuit and driven respectively by said engines, and automatic means responsive to the existence of any relative speeds of said generators for resynchronizing them.

2. A system of electric ship propulsion comprising, in combination, a plurality of engines having substantially the same no-load speed but having appreciably different speed-torque characteristics, a plurality of synchronous generators driven respectively by said engines, said generators being connected in parallel, a synchronous propeller motor, means for connecting said motor to said generators for reversing the direction of the ship, means for synchronizing said generators while they are so connected to each other and to the motor comprising apparatus which applies excitation to said generators, and separate means responsive to a subsequent loss of synchronism due to inequality of engine torque for positively resynchronizing said generators.

3. A system of electric ship propulsion comprising, in combination, a plurality of prime movers, individual means for controlling the torque of each prime mover, a plurality of parallel-connected synchronous generators driven respectively by said prime movers, a synchronous propeller motor connected to said generators, and automatic electric synchronizing means responsive to the relative speed of said prime movers for operating said torque controlling means so as to increase the torque of any prime mover which operates below the average speed of all of them and so as to decrease the torque of any prime movers which operate above the average speed of all of them.

4. In combination, a plurality of prime movers, a plurality of parallel-connected synchronous generators driven respectively by said prime movers, means responsive to a relatively small difference between the speed of any prime mover and the average speed of all of the prime movers for increasing the torque of any prime mover whose speed is less than the average speed of all of the prime movers, and means responsive to a relatively large difference between the speed of any prime mover and the average speed of all of the prime movers for reducing substantially to zero the load on any prime mover whose speed is less than the average speed by a relatively large amount.

5. In combination, a plurality of Diesel engines, a plurality of parallel-connected synchronous generators driven respectively by said engines, separate parallel-connected direct-current pilot generators driven respectively by said engines, said pilot generators having equal voltages when their speeds are the same, means responsive to a current flow in any pilot generator for raising and lowering the torque of its associated synchronous generator in accordance with the polarity of such current in such a manner as to tend to maintain said generators in synchronism, and means responsive to a relatively large current in any pilot generator for removing the field excitation of its associated synchronous generator in order to prevent stalling of the engine which drives it.

6. In combination, a plurality of prime movers, a plurality of parallel-connected synchronous generators driven respectively by said prime movers, means for simultaneously applying and removing the excitation of all of said generators, means responsive to a loss of synchronism of any of said generators with respect to the other generators for controlling said generator so as to resynchronize it with the other generators, and manually operable means for simultaneously adjusting the speed of all of said prime movers.

7. In combination, a plurality of prime movers, a plurality of parallel-connected synchronous generators driven respectively by said prime movers, means for simultaneously applying and removing the excitation of all of said generators, means responsive to a loss of synchronism of any of said generators with respect to the other generators for controlling said generator so as to resynchronize it with the other generators, and separate manually operable means associated with each prime mover for adjusting its output so as to control the load division between said prime movers.

8. In combination, a plurality of prime movers, a plurality of parallel-connected synchronous generators driven respectively by said prime movers, separate speed governors for each of said prime movers and automatic means responsive to the loss of synchronism on the part of any one of said generators with respect to the others for adjusting the setting of the speed governor of its prime mover in the proper direction to restore synchronism.

9. In combination, a plurality of prime movers, a plurality of parallel-connected synchronous generators driven respectively by said prime movers, separate means for adjusting the field excitation of each generator, and means responsive to the loss of synchronism on the part of any generator with respect to the other generators for causing said excitation controlling means to raise the excitation of said generator.

10. In combination, a plurality of prime movers, a plurality of parallel-connected synchronous generators driven respectively by said prime movers, automatic means responsive to the loss of synchronism on the part of any generator with respect to the other generators for resynchronizing said generator with the others while excited and while under load, and master regulating means responsive to a function of the speed of all of said generators for simultaneously adjusting the outputs of all of said prime movers in response to variations in said function in such a manner as to maintain the average speed of all of said generators at a predetermined value.

11. In an electric ship propulsion system, a plurality of Diesel engines, a plurality of parallel-connected synchronous generators driven respectively by said engines, a synchronous propeller motor connected to said generators, a plurality of parallel-connected pilot generators driven respectively by said engines, said pilot generators having the same voltage when the speeds of the prime movers are the same, means responsive to current flow in any individual pilot generator for controlling the operation of its driving engine in such a manner as to reduce said current to zero, and means responsive to a departure of the resultant voltage of all of said pilot geenrators from a predetermined value for simultaneously controlling the speed of all of said engines in such a direction as to restore said resultant voltage to said predetermined value.

ERNST F. W. ALEXANDERSON.